I. COOPER & O. F. PRESBREY.
CLAMP.
APPLICATION FILED NOV. 25, 1916.
1,274,688.
Patented Aug. 6, 1918.
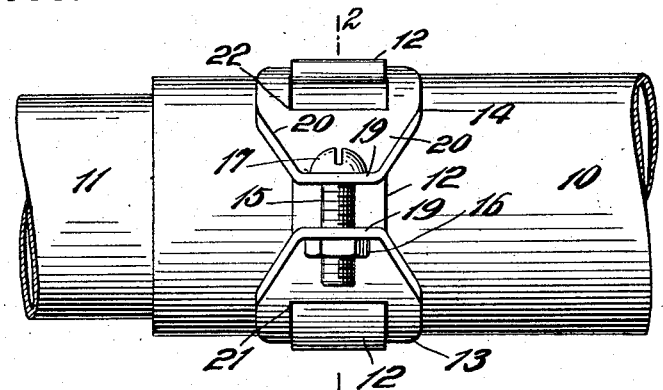
Fig.1.
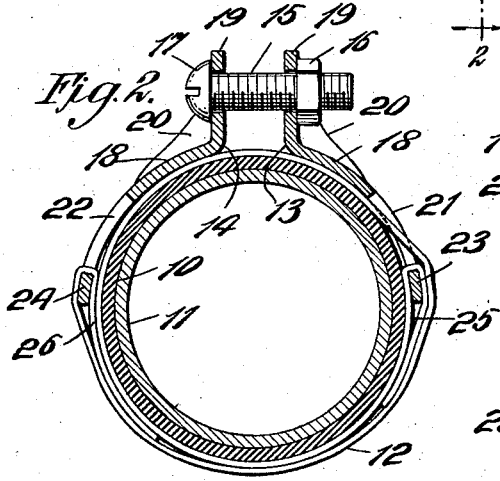
Fig.2.
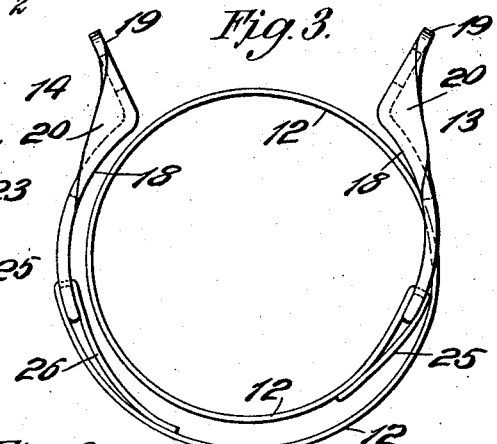
Fig.3.
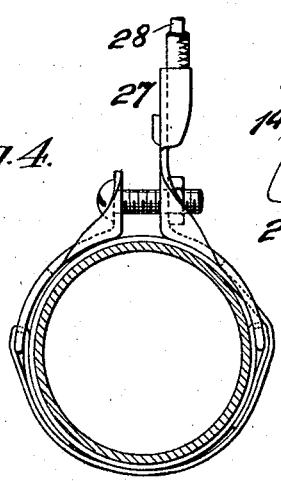
Fig.4.
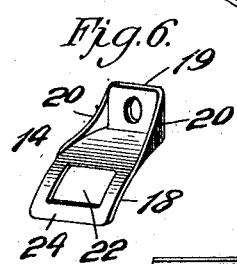
Fig.6.
Fig.5.
Inventors
OTIS F. PRESBREY
ISIDOR COOPER
By their Attorney,
Charles C. Gill.

UNITED STATES PATENT OFFICE.

ISIDOR COOPER AND OTIS F. PRESBREY, OF BROOKLYN, NEW YORK, ASSIGNORS TO OTIS-FLAGG CORPORATION, OF NEW YORK, N. Y., A CORPORATION OF NEW YORK.

CLAMP.

1,274,688.        Specification of Letters Patent.     Patented Aug. 6, 1918.

Application filed November 25, 1916. Serial No. 133,289.

*To all whom it may concern:*

Be it known that we, ISIDOR COOPER and OTIS F. PRESBREY, citizens of the United States, and residents of Brooklyn, in the county of Kings and State of New York, have invented certain new and useful Improvements in Clamps, of which the following is a specification.

The invention pertains more particularly to clamps of the character employed for binding a piece of hose onto a nipple or pipe and also for other purposes, as for illustration, connecting ground wires to pipes, rods and the like extending into the ground, these clamps being commonly called ground clamps.

The clamp of our invention may, in the hands of the user, be adjusted to the diameter of hose to be connected to a pipe, nipple or the like, and when adjusted and applied will exert a uniform pressure entirely around the hose.

One of the main purposes of the invention is to provide an efficient clamp which may be inexpensively manufactured and readily adjusted for and applied to the varying diameters of hose and pipes to be ordinarily met with, in lieu of having to carry in stock a large number of clamps adapted to different diameters of hose and pipes.

The clamp of our invention, aside from the final securing screw and nut, comprises three main parts, one being a ribbon strip or band of metal, and the other two parts being durable matching heads to which the ends of the strip or band are connected and through one of which one end of the strip or band is threaded prior to its connection with its head, whereby more than one complete convolution of the strip or band around the hose is secured. The ends of the strip or band which are merely extended through and bent downwardly from the heads are confined within the convolutions of the strip or band and require no additional securing means, said ends of the strip or band where connected with the heads, being free for adjustment so as to increase or decrease, as occasion may require, the dimensions of the clamp. Our invention provides a clamp of extreme efficiency and simplicity and one capable of ready manufacture and also of ready application by even an inexperienced person in binding a hose to a nipple, pipe or other conduit.

The invention will be fully understood from the detailed description hereinafter presented, reference being had to the accompanying drawings, in which:

Figure 1 is a top view, partly broken away, of a piece of hose and a piece of pipe bound together by a clamp constructed in accordance with and embodying our invention;

Fig. 2 is a vertical transverse section through the same taken on the dotted line 2—2 of Fig. 1;

Fig. 3 is a detached edge view of the clamp, less the final securing screw and nut, shown with its parts relaxed;

Fig. 4 is a sectional view through a pipe having the clamp of our invention applied thereto for grounding purposes, the clamp in this instance having integrally with one of its heads, means for securing the conducting wire;

Fig. 5 is a side elevation, partly broken away, of the same, and

Fig. 6 is a detached perspective view of one of the heads of the clamp to which the strip or band is attached.

In the drawings, referring to Figs. 1, 2 and 3, 10 designates a piece of hose clamped to a piece of pipe or a nipple 11 by a clamp embodying our invention and which comprises a metallic strip or band 12, heads 13, 14 to which the ends of said strip or band are attached in an adjustable manner, a screw 15 extending freely through apertures in the heads 13, 14, and a nut 16 engaging one of said heads and receiving the threaded portion of said screw, said screw having at one end a slotted head 17 adapted to be engaged by an ordinary screw-driver or the like.

The strip or band 12 is a plain flat strip or ribbon and may be of any length suited to the diameter of the hose 10. The heads 13, 14 correspond with each other and are of stamped metal and each has a base portion 18 and angle member 19, these parts being connected at each side of the head by an integral strengthening flange or web 20. The base members 18 of the heads 13, 14 are of arc formation, and said members are formed with openings 21, 22, respectively, which leave, at the outer ends of said members 18, cross-bars 23, 24, respectively. The members 19 of the heads 13, 14 extend outwardly as nearly as may be at right angles to the hose and when in use are substantially parallel with each other and receive in corresponding openings formed in them the screw 15, whose head 17 bears against one of said members and whose operative end is within the nut 16 which bears against the other of said members. The nut 16 is disposed between the web portions 20 of the head 13, and hence is not intended to rotate, the drawing of the heads 13, 14 toward each other in applying the clamp to position being effected by means of a screw-driver acting against the head 17 of the screw 15.

In assembling the parts of the clamp, one end of the strip 12 is inserted through the opening 21 of the head 13 and bent downwardly around the outer side of the bar 23, as shown in Fig. 3, and thence the other end of the strip or band 12 is carried around to form the inner convolution of the clamp and threaded through the opening 21 of the head 13, whence said end of the strip or band 12 is carried around said inner convolution and inserted inwardly through the opening 22 in the head 14 and bent downwardly along the inner side of the bar 24, as indicated at the left hand side of Fig. 3. The outer partial convolution of the strip or band 12 is parallel with and incloses, with the base members 18 of the heads 13, 14, so far as may be possible, the inner convolution of the strip or band 12. We number the outwardly and downwardly bent portion of one end of the strip or band 12 as 25 and the inwardly and downwardly bent portion at the other end of the strip or band as 26. The outer convolution of the strip or band, when the parts are assembled and applied, bears against the end 25 and prevents said end from in any manner escaping from the head 13, and the inner convolution of the strip or band under the same condition bears against the inwardly and downwardly bent portion 26 at the other end of said strip or band and prevents said part 26 from escaping from the head 14.

Preferably the strip or band 12 and heads 13, 14 will be assembled at the time the clamp is to be applied to the hose or other article, and in carrying out this feature of the operation the end portion 25 may be threaded through the opening 21 of the head 13 and bent downwardly along the outer side of the body of the strip or band, and thereupon the head 13 and strip or band may be applied against the hose or other article and the strip carried around the same, the free end of the strip or band being threaded through the opening 21 of the head 13 and brought around to the opposite side of the hose and threaded inwardly through the opening 22 of the head 14 and bent downwardly along the inner side of the cross-bar 24, thus leaving the parts about in the condition shown in Fig. 3 encompassing the hose. Thereafter the heads 13, 14 may be drawn together between the thumb and finger and the screw and nut applied to the heads 13, 14, and finally a screw-driver may be employed in connection with the screw and nut for closely and efficiently binding the strip or band 12 around the hose and securing the heads 13, 14 in their proper relation to each other, the clamp then taking the condition shown in Figs. 1 and 2. Should it be found that the strip or band 12 is a little too long to suit the diameter of the hose 10, this may be corrected at either or both ends of said strip or band by increasing the length of the bent portions 25, 26 thereof, and should it be found that the strip or band 12 is too short when in the condition shown in Fig. 3 for firmly clamping the hose 10, the diameter of the clamp may be properly increased by shortening the bent portions 25, 26 to add increased diameter to the clamp as a whole. The end portions 25, 26 are not rigidly fastened on the cross-bars 23, 24, and hence the ends of the strip or band 12 may be not only quickly applied to the heads 13, 14, but also adjusted to said heads to meet the condition that may exist as to the diameter of the hose or other article to which the clamp is to be applied. In addition if it should be found that the strip or band 12 is materially too long to suit the diameter of a piece of hose or the like, the person applying the clamp may readily clip off a piece from the end of said strip or band so that the strip or band will be of suitable length for the diameter of clamp required.

The simple construction of the parts of the clamp and the readiness with which they may be assembled, will be readily appreciated without extended comment. The strip 12 is simply one continuous piece or ribbon of sheet metal requiring no attention with the exception of connecting one end thereof to the bar 23 of the head 13 and then extending the other end thereof around on the line of a circle and through the opening 21 of the head 13, whence the said end of the strip is threaded inwardly through the opening 22 of the head 14 and bent or folded downwardly, as at 26, both ends of the strip being thus secured in an effective and adjustable manner. The heads 13, 14 are counterparts of each other and are of stiff metal capable of withstanding the force exerted by the screw 15 and nut 16, together with the internal pressure exerted by tightly applying the clamp on the hose. The strip or band 12 being integral may be of light flexible sheet metal and yet serve with entire efficiency due partly to the fact that the convolutions of the strip or band are one within the other. The strip or band 12 when applied to the hose extends entirely around the same and exerts a uniform pressure entirely around the hose, the pull of the heads 13, 14 being on the ends of the strip and serving to draw that portion of the strip between the heads 13, 14 inwardly against the hose. A mechanic or even an unskilled person possessing a roll of metal suitable for the strips or bands 12, and some of the heads 13, 14, may readily construct and apply the clamps to hose and other parts varying greatly in diameter, and this is one of the desirable benefits of the invention. The strip or band 12 is not cut away or reduced in width where it enters the openings in the heads 13, 14, or even elsewhere, and hence the full strength of the metal strip or band is preserved. The heads 13, 14 are stampings, and one of these heads is illustrated in perspective in Fig. 6, and said heads are formed from a strip of metal of uniform width, the heads however becoming narrower at the members 19 thereof, due to the formation of the stiffening webs or flanges 20.

In Figs. 4 and 5 we illustrate the use of our invention as applied for grounding wires or as a ground clamp, and in the construction shown in Figs. 4 and 5 we form one of the heads with an extension 27 adapted to receive in a well-known manner one end of the conducting wire 28. The presence of the extension 27 constitutes the only difference between the clamps shown in Figs. 4 and 5 and that illustrated in Figs. 1, 2 and 3, and therefore no extended explanation of the clamps shown in Figs. 4 and 5 is required.

What we claim as our invention and desire to secure by Letters Patent, is:

1. A clamp of the character described, comprising a plain uniform metal strip, independent heads to which the ends of said strip are attached, and means for drawing said heads toward each other for binding the clamp upon the article to which it may be applied, one end of said strip prior to being attached to its head being carried around and threaded through the other head to form one convolution and then brought around for attachment to its head, whereby the strip forms one complete inner band and with the heads a partial outer band.

2. A clamp of the character described, comprising a plain uniform metal strip, heads having openings through which the ends of said strip are extended and folded over for attachment thereto, and means for drawing said heads toward each other for binding the clamp upon the article to which it may be applied, one end portion of the strip being passed outwardly through the opening in its head and folded downwardly, and the other end portion of the strip being passed inwardly through the opening in its head and folded downwardly, and one end of said strip prior to being attached to its head being carried around and threaded through the other head to form one convolution and then brought around for attachment to its head, whereby the strip forms one complete inner band and with the heads a partial outer band.

3. A clamp of the character described, comprising a plain uniform metal strip, heads having curved base members provided with openings and members extending outwardly therefrom having alined openings through them, and a screw and nut applied to said outwardly extending members for drawing said heads toward each other, said strip at its ends being extended through the openings in said base members for connection with said members, and one end of said strip prior to being attached to its head being carried around and threaded through the other head to form one convolution and then brought around for attachment to its head, whereby the strip forms one complete inner band and with the heads a partial outer band.

4. A clamp of the character described, comprising a plain uniform metal strip, heads having curved base members provided with openings and members extending outwardly therefrom having alined openings through them, and a screw and nut applied to said outwardly extending members for drawing said heads toward each other, one end portion of the strip being passed outwardly through the opening in the base member of its head and folded downwardly for attachment to said member, and the other end portion of the strip being passed inwardly through the opening in the base portion of its head and folded downwardly for attachment to said member, and one end of said strip prior to being attached to its head being carried around and threaded through the other head to form one convolution and then brought around for attachment to its head, whereby the strip forms one complete inner band and with the heads a partial outer band.

Signed at Brooklyn, in the county of Kings, and State of New York, this 22nd day of November, A. D. 1916.

ISIDOR COOPER.
OTIS F. PRESBREY.

Witnesses:
ARTHUR MARION,
CHAS. C. GILL.